United States Patent [19]
Mamone

[11] Patent Number: 5,433,853
[45] Date of Patent: Jul. 18, 1995

[54] METHOD OF CLARIFYING WASTESTREAMS

[75] Inventor: Anthony M. Mamone, Bethelem, Pa.

[73] Assignee: Polybac Corporation, Bethlehem, Pa.

[21] Appl. No.: 141,844

[22] Filed: Oct. 22, 1993

[51] Int. Cl.$^6$ ............................................... C02F 1/56
[52] U.S. Cl. ................... 210/615; 210/631; 210/708; 210/709; 210/710; 210/725; 210/727; 210/802; 210/803; 210/804
[58] Field of Search ............... 210/615, 616, 617, 631, 210/708, 709, 710, 725, 727, 802, 803, 804, 521, 522

[56] References Cited

U.S. PATENT DOCUMENTS

| | | | |
|---|---|---|---|
| 3,846,293 | 11/1974 | Campbell | 210/725 |
| 4,026,794 | 5/1977 | Mauceri | 210/708 |
| 4,388,195 | 6/1983 | von Hagel et al. | 210/802 |
| 4,661,265 | 4/1987 | Olson et al. | 210/804 |
| 4,818,392 | 4/1989 | Werner et al. | 210/521 |
| 5,178,773 | 1/1993 | Kerlin | 210/727 |

*Primary Examiner*—Peter A. Hruskoci
*Attorney, Agent, or Firm*—Pennie & Edmonds

[57] ABSTRACT

The present invention provides for a novel method of removing emulsified oils, dissolved solids and particulates from a water containing liquid wastestream comprising chemically treating the wastestream with an acid, a coagulant, and a flocculant and subsequently flowing such treated wastestream upwardly through a vertical plate pack chamber.

10 Claims, 1 Drawing Sheet

METHOD OF CLARIFYING WASTESTREAMS

TECHNICAL FIELD

This invention pertains to the treatment of wastestreams in a vertical plate interceptor chamber. This invention is especially applicable for the treatment of wastestreams from the industrial and commercial laundry industries, and specifically from food processing, plating, chemical manufacturing, petroleum production and petroleum refining activities.

BACKGROUND OF THE INVENTION

The Vertical Plate Interceptor ("V.P.I.") system was initially developed in order to satisfy the extremely small space available at most existing industrial sites. Many of todays industrial sites were developed without consideration for wastewater treatment equipment due to the lack of regulations for the waste being generated.

The lack of available space made it very difficult for existing facilities to incorporate a treatment system comprised of an existing technology, specifically the use of a dissolved air flotation device. Herein lied a dilemma for companies required to treat their wastewater without the space necessary to install such a traditional system. The facility was therefore forced to pay high surcharge cost for discharging water with constituents at concentration higher than permitted, build an addition to the facility to house the required treatment system or close the facility if a resolution to the problem could not be addressed.

SUMMARY OF THE INVENTION

The present invention makes it possible for facilities with very limited space to treat their wastewater without the need to expand their facilities.

Other benefits that the present invention has over the dissolved air flotation (D.A.F.) system include the following.

1. The present invention requires no air pollution control devices as compared to the D.A.F. system. The present invention does not use diffused air in its process compared to the D.A.F. system, which injects air directly into the wastestream to force a separation of the solids from the liquid phase. The process using the D.A.F. System causes volatile organic compounds entrained in the wastestream to be released into the atmosphere thereby creating additional environmental concerns.

2. The V.P.I. system has no moving parts as compared with the D.A.F. system that utilizes a skimming device to rake across the surface of the liquid to remove floating solids.

3. The V.P.I. system utilizes approx. 25% less space than a D.A.F. system utilizes. This is due to the more compact size of the V.P.I. unit versus the D.A.F. Unit.

The present invention is capable of removing emulsified oils and grease from a liquid wastestream using a V.F.I. device by means of settling at efficiencies greater than 95%.

The invention also removes metals and other solids present in the wastestream at efficiencies greater than 95%.

The invention is unique in the way that the oil and grease are removed. The oil and grease is not floated and skimmed as with conventional methods. With this invention it is settled and pumped out of the bottom of the V.P.I.

DETAILED DESCRIPTION OF THE INVENTION

Figure 1:
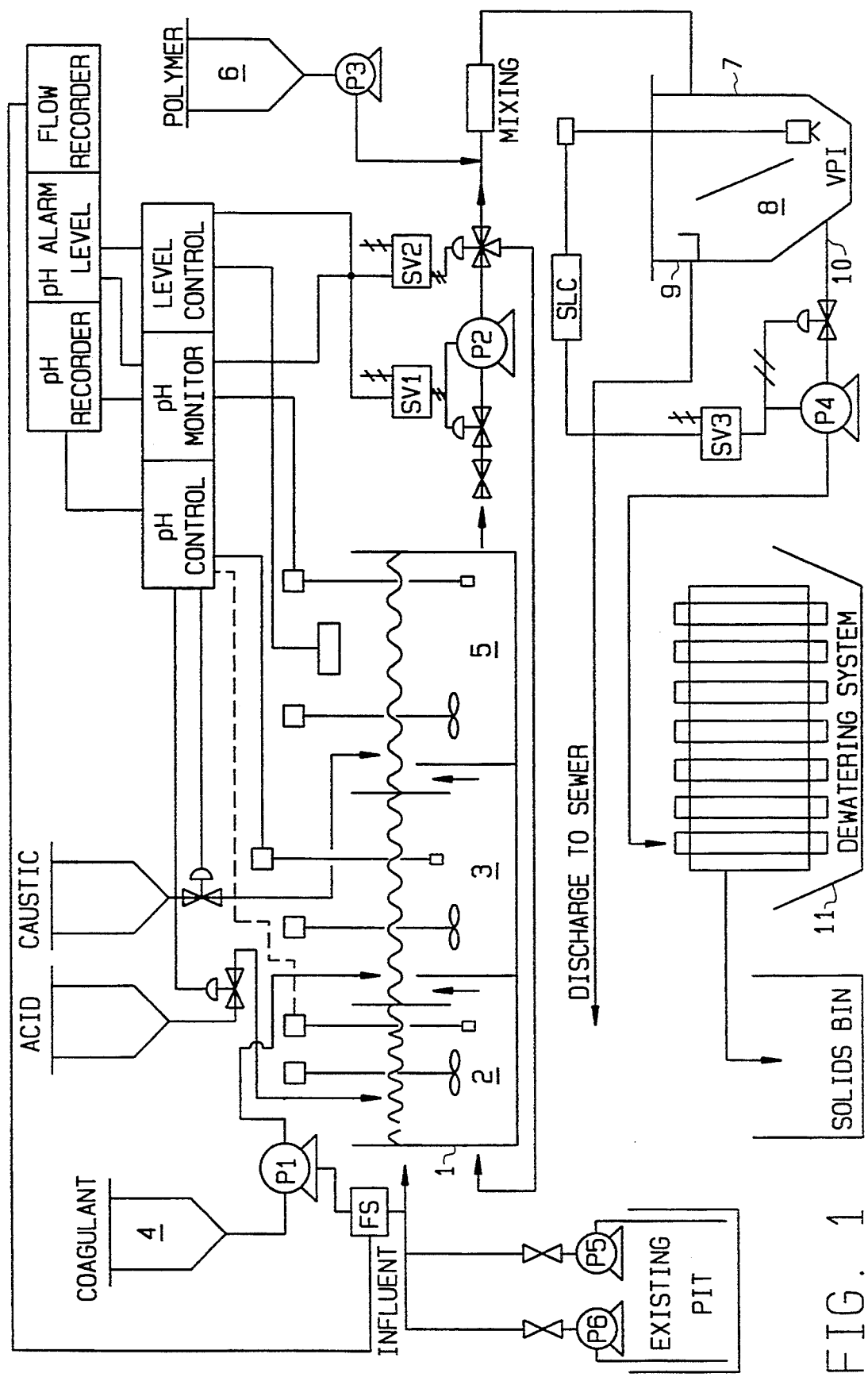
FIG. 1 is a schematic diagram of the clarification system using a Vertical Plate Interceptor.

To aid in the understanding of the instant clarification system, reference is made to FIG. 1.

Wastewater is pumped directly from a holding tank into a three compartment chemical mixing tank (1). As the wastewater influent enters the tank the rate of flow is measured via a non-invasive flow meter. The produced signal output from the meter is used to determine the rate in which the chemicals discussed below are added into the various compartments of the mixing tank. The waste water is blended with the chemicals by dynamic mixers.

The first compartment of the mix tank (2) adjusts the pH of the incoming water from approximately 10 pH to approximately 6.0 standard pH units (S.U.) This adjustment reduces the consumption of the next chemical to be added by about 50% and is another unique feature of this invention. The wastewater then passes through a baffle system into the second compartment.

The second compartment of the mix tank (3) is used to add a chemical coagulant. The coagulant (4) is preferably ferric chloride or aluminum chloride, and most preferably ferric chloride, and is used to remove particulates by means of precipitation. A dynamic mixer is used in this compartment to assure proper blending of the coagulant and the wastewater. As the chemical coagulant is added it attaches to the oil and grease contaminants as well as other constituents in the wastestream such as metals, fibers and lint.

The coagulant is added at a dosage based on the level of contamination in the wastestream. The dosage is usually adjusted in a range between 200 and 3000 parts per million (PPM). The addition of coagulant lowers the pH to approx. 4.0 S.U.

The water then enters the third compartment (5) where the pH is readjusted to approximately 6.0 S.U. and where a dynamic mixer ensures complete blending. When this occurs the metal component of the coagulant (ferric) is solubilized causing the oil, grease and other constituents to be separated from the liquid phase as a solid. This third compartment also serves as a level control (flow control to V.P.I.) and final pH check prior to leaving the mixing tank. This pH monitoring automatically controls a recirculation loop in the event that the pH is not within discharge limits. In addition, an alarm system is incorporated to provide adequate warning in the event of a critical malfunction.

The final step in the chemical separation process is the flocculation of the solids. As the wastewater is discharged to the V.P.I. a cationic polymer (6) of high molecular weight is added at a concentration between 0.1% to 0.5%. The polymer injection rate into the wastewater is controlled proportionally to the mixing tank level control. This proportional feed and mixing system assures the greatest efficiency in producing a stable floc. The flocculant is added to cause an attraction between the solids allowing them to gather and build mass.

Physical Separation

Physical separation of the flocculated solids from the water occurs in the V.P.I. unit containing the plate pack chamber.

The V.P.I. plate pack chamber is a rectangular box-like compartment incorporated as an integral part of a complete unit. This compartment is inside the unit and is aligned at a 60 degree angle to the horizontal, with the length of the chamber acting as a conduit to provide a path for the liquid and solids to follow.

The compartment has an arrangement of corrugated plates made of plastic, fiberglass reinforced plastic or metal. The plates are arranged in a parallel fashion in the chamber to allow flow along the length of the chamber with the corrugation in-line with the flow.

The length of the plates is approximately 5 feet and corresponds to the chamber length. The width of the plates is approximately 9 feet and correspond to the width of the chamber. The height of the plate pack is measured from the inside surface of the chamber to the inside surface of the opposite side of the chamber. The plates are arranged within this compartment in a manner that provides a space between each plate of approximately 0.75". This space can vary between 0.75" and 2.0" depending on laboratory testing of the wastewater to be treated. The typical number of plates used for this process vary between 20 and 50. The size of the plates, the spacing of the plates and the number of plates define the total surface area available in the V.P.I. plate pack chamber. The total surface area in turn determines the maximum flow rate the wastestream can flow through the chamber while still maintaining satisfactory separation of the flocculated solids from the water.

The flocculated solids and water enter the V.P.I. (7) and are initially directed in a downward flow through a baffle system allowing the heavier solids to settle at the bottom of the V.P.I.

As the water is subsequently directed upwardly through the vertical plate pack chamber (8) on a 50 to 60 degree, preferably 60 degree angle from the horizontal, with plates separated by about 0.75 inches, additional removal of solids occur as a result of the solids settling on the plates and sliding down into the bottom of the V.P.I. The separated wastestream may be further treated by a biological treatment system such as that disclosed in U.S. Pat. No. 4,599,174 of C. S. McDowell, assigned to Polybac Corporation, the disclosure of which is incorporated by reference.

The chamber further comprises a tuning fork sensor capable of producing a signal indicating the amount of solids in the bottom of said chamber by changes in the frequency of vibration of the sensor. As solids accumulate in the solids compartment, they are detected by means of vibrating tynes. The tynes sense a shift in their natural resonant frequency indicating the presence of solids. The produced signal activates a pump allowing the solids to be sent directly to a dewatering system. The supernate phase is discharged directly to the sewer.

The separated water exits the V.P.I. from the top (9) and is discharged directly to the sewer.

The solids are removed from the bottom of the V.P.I. (10) by a pump system and are sent to a dewatering device (11) for further concentration of solids so as to produce solid cake suitable for landfill.

System Limitations

Wastewater flow—is based on a ratio of flow to surface area of plates and is generally established as 1 GPM/sq. ft. of plate area (GPM=gallons per minute).

Contaminant concentration—is based on laboratory testing and is generally established as the ability to meet discharge limitations for the regulated contaminant with a minimum of 95% of the contaminant removed.

For example, a discharge limit of 100 parts per million is required for a given contaminant. A removal efficiency of 98% has been determined for this wastestream. In order to calculate the maximum system load 100 is divided by 0.02=5,000 parts per million maximum contaminant loading.

EXAMPLE

A five (5) gallon sample of wastewater was obtained on Jun. 1, 1992 from Cintas' process wastestream, which is an industrial laundry wastestream.

The sample was tested for initial Chemical Oxygen Demand ("COD"), Total Suspended Solids ("TSS") and Total Petroleum Hydrocarbons ("TPH") concentrations. Bench-scale simulations were performed on the sample. These included simulation of the Vertical Plate Interceptor for clarification of insoluble materials and a Belt Press for dewatering capabilities of the solids.

To enhance clarification in the V.P.I. simulation, the addition of chemicals was necessary. The chemicals utilized in the simulation included a primary coagulant from Textile Chemical Co., which is a 40% ferric chloride acid solution at a pH of 2, and an emulsion polymer sold by Calloway Chemicals, a division of Exxon, as "4880", which comprises cationic polyacrylamide.

Prior to the addition of the coagulant, sulfuric acid was added to depress the pH from 10.4 to 3.5 units. The ferric chloride acid solution was then added to a 1000 ml beaker of sample at a dosage rate of approximately 350 ppm. As this product was added, the pH was depressed slightly. The metal component of the coagulant (ferric) was immediately solubilized since ferric cannot remain insoluble below pH of 6.0 units. A pH adjustment was subsequently made to about 6.1 to about 6.5 pH units. At this pH range, the ferric completely precipitates resulting in coagulation of the particles.

After the coagulation reaction had been achieved, a minimal amount of an organic flocculant (approximately 20 ppm) was required to assist in binding the coagulated particles as they may desirably "settle" more easily in the Vertical Plate Interceptor unit. The flocculant, which is best suited for this application, is cationic polyacrylamide (the "emulsion polymer" discussed above) with an extremely high cationic charge and high molecular weight polymer. When diluted to 0.1%–0.5%, this product not only achieves efficient results but will generate a "sludge" (precipitate) desirable for dewatering.

A dewatering process through a laboratory filter assembly was also simulated. During this laboratory simulation, complete dewatering was achieved in less than 30 seconds with a fine mesh material.

The results of the VPI simulation are:
1. COD reduction of 94% reducing from 8,170 ppm to 497 ppm;
2. TSS reduction of 99% reducing from 938 ppm to 6.0 ppm;
3. TPH reduction of 98% reducing from 405 ppm to 6.8 ppm.

See also Table 1.

TABLE 1

| Parameter | Results Before | Results After | Test |
|---|---|---|---|
| Chemical Oxygen Demand (mg/L) | 8,170 | 497. | EPA No. 410.1 |
| Total Suspended Solids (mg/L) | 938. | 6.0 | EPA No. 160.2 |
| Total Petroleum Hydrocarbons (mg/L) | 405. | 6.8 | EPA No. 418.1 |

Note: TPH results reported on a dry weight basis.
Results are for the wastestream before and after the described bench-scale simulation test.
The referenced test methodology is disclosed in EPA Publication EPA -600/4-79-020.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

All references cited in the present specification are incorporated by reference in their entirety.

What is claimed is:

1. A method of removing emulsified oils, dissolved solids and particulates from a water containing liquid wastestream comprising the steps of:
   a. adjusting the pH of the wastestream to a pH of about 6;
   b. adding a coagulant to precipitate the dissolved solids;
   c. further adjusting the pH of the wastestream to a pH of about 6, whereby the coagulant and dissolved solids separate from the liquid phase;
   d. adding a flocculant to the wastestream; and
   e. flowing the waste stream upward through a vertical plate pack chamber aligned at an angle to the horizontal ranging from about fifty to about sixty degrees whereby the oils and solids substantially settle to the bottom of the chamber and the wastestream, separated from such oils and solids, exits the chamber from the top, wherein said chamber further comprises a tuning fork sensor capable of producing a signal indicating the amount of solids in the bottom of said chamber by changes in the frequency of vibration of the sensor, said signal activating a pump to remove said oils and solids from said chamber.

2. The method of claim 1 wherein the coagulant is ferric chloride or aluminum chloride.

3. The method of claim 1 wherein the flocculant is a cationic polyacrylamide.

4. The method of claim 1 wherein the plates of the vertical plate pack chamber are oriented about sixty degrees from the horizontal and spaced about 0.75 inches apart.

5. The method of claim 1 further comprising the step of biodegrading the wastestream exiting the vertical plate pack chamber.

6. The method of claim 5 wherein the biodegradation uses a fixed biological film.

7. The method of claim 1 further comprising the step of dewatering the oils and solids from the vertical plate pack chamber.

8. The method of claim 7 wherein the oils and solids are dewatered by a filter press.

9. The method of claim 1 wherein the wastestream exiting the vertical plate pack chamber is filtered to further remove oils and particulates.

10. The method of claim 1 wherein the wastestream is from food processing, plating, chemical manufacturing, petroleum production or petroleum refining.

* * * * *